Nov. 12, 1940.   S. M. BURKA ET AL   2,220,884
SEXTANT
Filed March 25, 1939
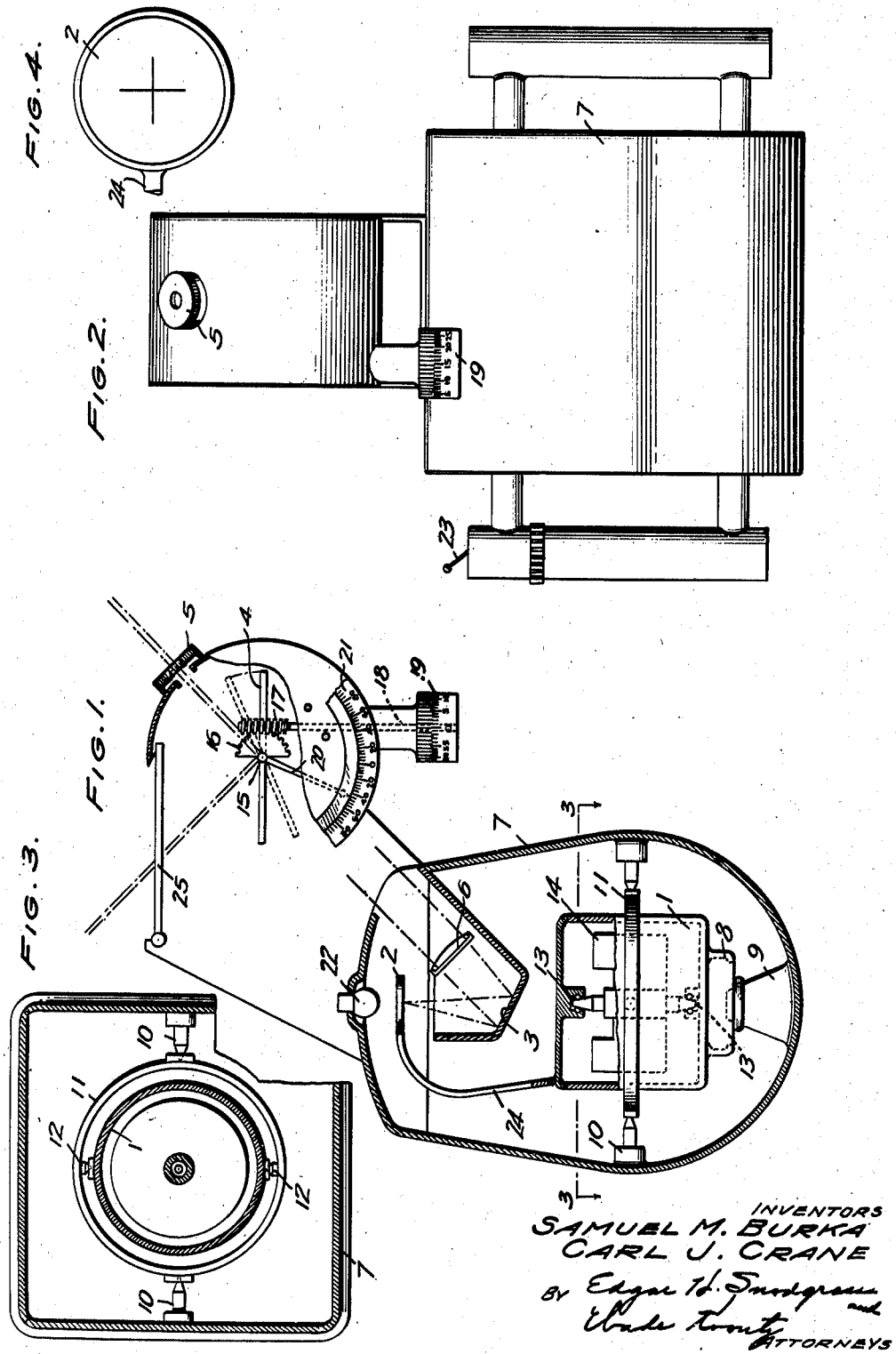

Patented Nov. 12, 1940

2,220,884

UNITED STATES PATENT OFFICE 2,220,884

SEXTANT

Samuel M. Burka, Dayton, Ohio, and Carl J. Crane, Montgomery, Ala.

Application March 25, 1939, Serial No. 264,106

7 Claims. (Cl. 88—2.4)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to a sextant having an artificial horizon or reference mark, gyroscopically stabilized so that it will not be affected by vibration or by short period accelerations of the instrument or the vehicle such as an airplane in which the instrument is used.

In the drawing,

Fig. 1 is a side view showing the sextant partly in cross-section and partly in elevation;

Fig. 2 is an elevation looking at the sextant from the right in Fig. 1;

Fig. 3 is a cross-section along the line 3—3 of Fig. 1; and

Fig. 4 is a plan view of the reticle.

Referring to Fig. 1, the casing 7 has rigidly mounted therein support bearings 10 which pivotally support a gimbal ring 11 upon which in turn are rigidly mounted bearings 12 similar to bearings 10 for pivotally mounting housing 1 carrying reticle 2 by means of arm 24. Gyro-rotor 14, preferably of the self erecting type, is carried with its spin axis vertical inside housing 1 by bearings 13. The gyro-rotor is caused to spin about its vertical axis by conventional means, not shown, since it does not constitute a part of the invention. As is well known, compressed air mechanism may be used. Swinging movement of reticle 2 is limited by a projection 8 on housing 1 cooperating with cup 9 on housing 7. Light 22 suitably wired to a source of electric power, not shown, and to switch 23, illuminates cross-hairs or other reference mark on reticle 2, the outlines of which are reflected by silvered mirror 3 through lens 6 and index glass or plate 4 to eyepiece 5. The image of the celestial body or object whose altitude it is desired to measure enters the sextant through shading glass 25 and is reflected to eyepiece 5 by index glass 4. Coincidence of the images of the observed body and the cross-hairs of the reticle is obtained by rotating index glass 4 by means of knob 19, the angle of rotation of the index glass being a measure of the altitude of the celestial body. Index plate 4 is pivotally mounted in casing 7 by shaft 15 and carries a pointer 20 which may be observed through a window in the casing for reading the degrees of angle of tilt of plate 4 on degree scale 21. Plate 4 is rotated by knob 19, shaft 18 and gear 17 cooperating with gear 16 fixed to plate 4. Minutes of elevation of plate 4 may be read by a suitable scale on knob 19. The index plate 4 and angle reading scales are "zeroed" so that the pointer 20 reads zero when the plate is tilted to a position where horizontal light rays, parallel to the artificial horizon established by reticle 2, will be reflected to the eyepiece. Thus it is seen that the angle which the observed body makes with the artificial horizon is read directly on the scale, permitting accurate determination of the altitude of a body regardless of the tilting of the sextant proper. The radius of rotation of the reticle and the optical system are so chosen as to make the images of the reticle and the body move in the same direction and the same amount when the instrument is tilted. To secure this equality of motion of the two images, the lens 6 must have a focal length equal to the distance of the reticle from the gimbal axis of the gyro and the reticle must be at the principal focus of the lens. Since the focal length of lens 6 is equal to the radius of tilt of reticle 2, the image of the reticle as observed in the eyepiece will maintain its position in space relative to an observed celestial body regardless of limited tilting of the instrument about a transverse horizontal axis. In order to read the altitude of an observed body, it is only necessary to bring the celestial body and the reference mark on the reticle into coincidence in the field of view of the eyepiece 5 and within the operative pivotal range of reticle 2. As shown in Fig. 1 of the drawing, lens 6 transmits an image of the reticle through the index plate and to the eyepiece by parallel bundles of rays. Due to the long period of the gyro, the artificial horizon formed by reticle 2 is, unlike a bubble or pendulum, unaffected by vibration or by the short period accelerations produced by movement of the instrument and of the airplane.

The instrument is free from precession due to the fact that the reticle is a part of the gyro housing itself and no work or loads, frictional or otherwise are imposed on the gyro in securing stabilization of the reticle.

It is to be understood that incidental features such as light 22 will have suitable wiring, that necessary connections will be made for supplying compressed air to the gyro if air driven or electrical connections if electrically driven. Also a conventional lock or latch may be provided to hold gyro 14 in locked inoperative position. These features are old and well known and form no part of the present invention.

In using the device, the observer at first brings the device into operative position with the reticle approximately horizontal, operates the necessary switches or valves to start the gyro to rotating.

Light from 22 will illuminate cross-hairs in reticle 2 of which the image will be observable in eyepiece 5 by means of the optical system consisting of mirror 3 and lens 6. Index plate 4 is rotated from its "zero" position by means of knob 19 until an image of the observed celestial body is reflected into coincidence with the image of the cross-hairs observed in the eyepiece. The angle through which the plate is rotated is the altitude of the observed body. It will be readily appreciated that the establishment of coincidence of the images of the cross-hairs and the body will give an accurate determination of the altitude of the body regardless of the horizontal tilting of the sextant. Lateral tilting of the sextant is controllable by the observer and, furthermore, has little effect upon the determination.

Details of construction may be altered or omitted without departing from the spirit of the invention and it is obvious that changes may be made that fall within the scope of the appended claims.

We claim:

1. A sextant comprising a casing, an eyepiece, a rotatably mounted index plate adapted to reflect and transmit images, a gimbal ring pivotally mounted in said casing, a rotor housing pivotally mounted in said gimbal ring, a gyro-rotor of the self-erecting type mounted in said rotor housing to spin about a vertical axis for stabilizing said housing, a reticle carried by said housing at a predetermined distance from the said pivotal mounting of said rotor housing to represent an artificial horizon, an optical system for reflecting the reference mark of said artificial horizon to said eyepiece, the focal length of said optical system being equal to said predetermined distance, means for rotating said index plate to produce coincidence of the reference mark of said artificial horizon with a body reflected by said index plate to said eyepiece.

2. A sextant comprising an eyepiece, a rotatably mounted index plate adapted to reflect and transmit images, a pivotally mounted reticle representing an artificial horizon and having reference means thereon observable through said eyepiece, said reticle being spaced a predetermined distance from its pivotal mounting, a precession-free, self-erecting gyroscope for stabilizing said reticle, an optical system having a focal length equal to said predetermined distance for transmitting an image of said reference means to said eyepiece, and means for rotating said index glass to establish coincidence of the reference mark of said artificial horizon with a celestial body reflected by said index glass to said eyepiece.

3. In a gyro sextant, a rotatably mounted index plate adapted to reflect and transmit images, a gyroscopically stabilized, pivotally mounted reticle spaced a predetermined distance from said pivotal mounting, an optical system for transmitting by parallel bundles of rays, an image of said reticle through said index plate to said eyepiece, the focal length of said optical system being equal to the said predetermined distance, and means to rotate said index plate to cause said image to coincide with an image of a celestial body reflected from said index plate to said eyepiece.

4. A sextant comprising a casing having an eyepiece, a gimbal ring pivotally mounted in said casing about a substantially horizontal axis, a rotor housing mounted in said gimbal ring to pivot about a substantially horizontal axis at right angles to said first horizontal axis, a gyro-rotor mounted in said rotor housing to rotate about a vertical axis, a reticle carried by said rotor housing, a reference mark on said reticle observable in said eyepiece, an index plate mounted in said casing to rotate about a transverse horizontal axis, scale means to indicate the angle which the index plate makes with respect to the reticle when stabilized, said index plate being arranged to reflect an image of an observed body into coincidence with the reference mark of the reticle when observed through said eyepiece.

5. In a gyro sextant, a rotatably mounted index plate adapted to reflect and transmit images, a gyroscopically stabilized, pivotally mounted reticle arranged to be illuminated, said reticle being spaced a predetermined distance from said pivotal mounting, an optical system for transmitting an image of said reticle through said index plate to said eyepiece, the focal length of said optical system being the same length as the said predetermined distance of said reticle from said pivotal mounting, and means for rotating said index plate to cause said image to coincide with an image of a celestial body reflected from said index plate to said eyepiece.

6. In a gyro sextant, an optical system including a lens having a predetermined focal length, an eyepiece and an index mirror for sighting a heavenly body, a reticle disposed in said optical system, a substantially precession-free gyroscope of the self-erecting type for supporting and stabilizing said reticle about two axes, said reticle being spaced from one of said axes by an amount equal to said focal length, whereby the center of said reticle may be made to coincide with the image of said heavenly body.

7. A device as recited in claim 6 and further including reference means on said reticle and scale means associated with said index plate, coincidence of said reference means and said heavenly body as observed through said eyepiece being readable on said scale as the altitude of the heavenly body regardless of limited tilting of said sextant about a transverse horizontal axis.

SAMUEL M. BURKA.
CARL J. CRANE.